US009951746B2

(12) United States Patent
Im et al.

(10) Patent No.: US 9,951,746 B2
(45) Date of Patent: Apr. 24, 2018

(54) POTENTIAL ENERGY-BASED POWER GENERATION SYSTEM

(71) Applicant: KOREA INSTITUTE OF ENERGY RESEARCH, Daejeon (KR)

(72) Inventors: Yong Hoon Im, Daejeon (KR); Dong Hyun Lee, Seoul (KR); Jae Yong Lee, Seoul (KR)

(73) Assignee: Korea Institute of Energy Research, Daejeon (KR)

( * ) Notice: Subject to any disclaimer, the term of this patent is extended or adjusted under 35 U.S.C. 154(b) by 75 days.

(21) Appl. No.: 14/784,593

(22) PCT Filed: Nov. 29, 2013

(86) PCT No.: PCT/KR2013/010984
§ 371 (c)(1),
(2) Date: Oct. 15, 2015

(87) PCT Pub. No.: WO2015/026011
PCT Pub. Date: Feb. 26, 2015

(65) Prior Publication Data
US 2016/0076509 A1    Mar. 17, 2016

(30) Foreign Application Priority Data
Aug. 21, 2013  (KR) .................. 10-2013-0099012

(51) Int. Cl.
*F03B 13/06* (2006.01)
*H01M 8/0656* (2016.01)
(Continued)

(52) U.S. Cl.
CPC ............... *F03B 13/06* (2013.01); *C25B 1/04* (2013.01); *C25B 15/02* (2013.01);
(Continued)

(58) Field of Classification Search
CPC ......... Y02E 60/17; Y02E 60/56; Y02E 70/10; Y02E 70/20
See application file for complete search history.

(56) References Cited

U.S. PATENT DOCUMENTS 3,810,717 A * 5/1974 Rakcevic ................ F03B 13/06
290/52
4,284,899 A * 8/1981 Bendiks .................. F03B 13/06
290/1 R (Continued)

FOREIGN PATENT DOCUMENTS

CA       2806834 A1 *  5/2013  .............. F03B 17/04
CN   102797616 A  * 11/2012  .............. F03B 13/06

(Continued)

*Primary Examiner* — Michael Leslie
*Assistant Examiner* — Matthew Wiblin
(74) *Attorney, Agent, or Firm* — Rabin & Berdo, P.C.

(57) ABSTRACT

A potential energy-based power generation system comprises a first reservoir disposed on an upper part of a building and configured to reserve water, a second reservoir located underground of the building and configured to reserve the water, a small hydro power generation unit including a small hydro power generation turbine to generate the power, a fuel cell power generation unit disposed at one side of the first reservoir and configured to generate the power using the hydrogen gas, an electrolysis device disposed in the second reservoir and configured to perform electrolysis for decomposition of the water into the oxygen and hydrogen gas by using the external power or the power generated by the small hydro power generation unit.

12 Claims, 2 Drawing Sheets

(51) Int. Cl.
  *C25B 15/02* (2006.01)
  *C25B 1/04* (2006.01)
  *H01M 8/04082* (2016.01)

(52) U.S. Cl.
  CPC ..... *H01M 8/04201* (2013.01); *H01M 8/0656* (2013.01); *F05B 2220/61* (2013.01); *H01M 2250/10* (2013.01); *Y02B 90/14* (2013.01); *Y02E 10/22* (2013.01); *Y02E 60/17* (2013.01); *Y02E 60/366* (2013.01); *Y02E 70/10* (2013.01); *Y02E 70/20* (2013.01); *Y02P 20/133* (2015.11)

(56) References Cited

U.S. PATENT DOCUMENTS

| | | | | |
|---|---|---|---|---|
| 4,310,769 | A | * | 1/1982 | Mazzone ............... E02C 1/02 290/1 R |
| 4,443,707 | A | * | 4/1984 | Scieri ............... F03B 13/06 290/4 A |
| 6,841,893 | B2 | * | 1/2005 | Maiwald ............... F03B 3/06 290/1 R |
| 8,008,796 | B2 | * | 8/2011 | Muchow ............... E03B 11/12 290/43 |
| 8,492,918 | B1 | * | 7/2013 | Kamenov ............... F03B 13/06 290/43 |
| 2010/0253080 | A1 | * | 10/2010 | DeAngeles ............ F03B 13/06 290/52 |
| 2014/0137951 | A1 | * | 5/2014 | Hyde .................... F16L 53/00 137/335 |

FOREIGN PATENT DOCUMENTS

| | | | | |
|---|---|---|---|---|
| CN | 102797616 | A | | 11/2012 |
| JP | 02196168 | A | * | 8/1990 ............. Y02E 70/10 |
| JP | 06264756 | A | * | 9/1994 ............. F02B 43/10 |
| JP | 2000240554 | A | * | 9/2000 ............. Y02E 70/10 |
| JP | 2003-278632 | A | | 10/2003 |
| JP | 2007-146820 | A | | 6/2007 |
| JP | 2009-174509 | A | | 8/2009 |
| JP | 2009174509 | A | * | 8/2009 ............. F03B 13/06 |
| JP | 2012-041757 | A | | 3/2012 |
| KR | 10-0699115 | B1 | | 3/2007 |
| KR | 10-0802800 | B1 | | 2/2008 |
| KR | 10-2011-0130124 | A | | 12/2011 |

* cited by examiner

POTENTIAL ENERGY-BASED POWER GENERATION SYSTEM

TECHNICAL FIELD

The present invention relates to a potential energy-based power generation system, particularly to a potential energy-based power generation system by the medium of potential energy of water by using the power generated by renewable energy power generation sources.

BACKGROUND ART

Generally, hydropower (or small hydropower) generation system which uses geographic height difference, pulls the water from the low position up to the higher position and stores it by operating a pump with time-based available surplus power and operates the turbine in the low position by releasing the water to produce electricity on demand of electric power is very useful technology as a means of storage for electricity of which surplus energy is not easy to be stored.

In particular, when the gap between supply and demand of time-based power is large, a pump is operated to add high potential energy by surplus power. On demand of power, the water in the high position is released to produce electric power stably for a constant period of time. Thus, the potential energy-based power generation system has a superior characteristic for coordination with new renewable energy generation sources, which are characterized by intermittent power generation.

However, there are not many locations that are proper for hydropower (or small hydropower) generation with geographical conditions having appropriate height difference with abundant water sources. There are also environmental problems caused by installment and operation of (small) hydro power generation system allowing large capacity power generation, a civil complaint regarding acceptance of residents. In addition, there is a problem regarding power transmission to demand locations i.e., a proper site and a location in a long distance. Thus, (small) hydro power generation systems were less competitive than other power generation systems (i.e., a thermal power generation, a combined cycle power generation system, etc.)

In addition, transferring by a conventional pump is essential for the process in which a media (water) with a low potential energy is made one with a high potential energy, and it causes inevitable loss. Thus, there is need for searching a solution which is more efficient, cost-saving compared to technology for procuring potential energy using a conventional pump.

Meanwhile, a hydro power generation system and the method for generating power therewith was developed and registered as Korean Patent No. 10-0699115.

In addition, a fuel cell power generation system and the method thereof which retrieve efficiently the thermal energy caused during the electric power generation process by using a fuel cell and use it were developed and registered as Korean Patent No. 10-0802800.

However, the inventions above could not solve the aforementioned problems. There was not any power generation system which could overcome the aforementioned problems.

DISCLOSURE

Technical Problem

Accordingly, the present invention is derived to solve the aforementioned problems, and the objective of the present invention is to provide a potential energy-based power generation system which minimizes loss due to a long distance between a power generation source and a demand side by a power generation system utilizing potential energy of an artificial structure (i.e., high-rise buildings, etc.) higher than a certain height which is not a natural geographical object.

In addition, the objective of the present invention is to provide a potential energy-based power generation system in which a potential energy is used more efficiently, by combining a fuel cell power generation system installed in the one end of a first reservoir and an electrolysis device installed in the one end of a second reservoir, compared to a method for applying a potential energy of the water by using a conventional pump.

Technical Solution

In order to accomplish the above objectives, a potential energy-based power generation system of the present invention comprises a pump and a first reservoir for procuring constant potential energy by obtaining power from new renewable energy power generation sources or a surplus power source and transferring water on the ground surface to an upper part of a building; a small hydro power generation unit comprising a small hydro power generation turbine and a second power generator and converting the potential energy into power by pouring the water in the first reservoir; a second reservoir located underground of the building to procure additional potential energy, and storing the water which has passed through the small hydro power generation turbine; and an electrolysis device performing electrolysis by using the power generated by the small hydro power generation unit and the power supplied from the new renewable energy power generation sources or the surplus power source to procure a storage space of the second reservoir for the small hydro power generation, and producing and separating each of hydrogen and oxygen gases; and a fuel cell power generation unit comprising a fuel cell provided at one side of the first reservoir and a first power generator, and located at the upper part of the building to generate power by receiving the produced hydrogen gas, and storing water produced as a by-product in the first reservoir.

In addition, the present invention further comprises a power converter for converting external power (grid power) or power generated by the small hydro power generation turbine into direct current; and a transfer unit including a hydrogen transferring pipe and an oxygen transferring pipe for transferring the produced hydrogen and oxygen gas to a fuel cell and an oxygen storage tank respectively.

The present invention comprises a supply pipe for supplying the water from the first reservoir to the small hydro power generation unit and the supply pipe preferably includes a second control valve for controlling the amount of falling water.

In addition, it is desirable to apply surplus power of cogeneration or power generated by new renewable power generation to power for driving a pump for transferring the water to the first reservoir and storing the water.

In addition, it is desirable that the power generated by the fuel cell is transferred to the grid in connection, and is stored as potential energy and utilized by storing the water by-product in the first reservoir.

The hydrogen transferring pipe is composed of a double pipe, hydrogen is filled in the inner pipe, and an inert gas i.e. nitrogen, etc. is filled in the outer pipe in order to provide safety for transfer of very explosive hydrogen.

In addition, in case power generation from the surplus power or new renewable energy power generation sources is not allowed and the storage space of the second reservoir (210) is available, the potential energy-based power generation system operates the fuel cell to generate power by releasing the water from a ground water-collecting power generation source to the small hydro power generation unit, and electrolyzing the water in the second reservoir through the electrolysis device by the generated power, and simultaneously operation for procuring potential energy in the first reservoir can be possible.

In addition, the new renewable energy power generation sources are used as power operating a pump which transfers a ground water-collecting source to the first reservoir. When the amount stored in the first reservoir reaches above a certain amount, a certain part of power generated in the small hydro power unit equipped on the ground (or underground) is connected with the grid to be sold according to capacity of each reservoir and operating conditions. As the produced hydrogen (fuel) is supplied to the fuel cell by electrolyzing the water of the second reservoir with the other certain part of power, the second reservoir should retain the storage capacity, which is essential for water falling from the first reservoir to generate power.

In addition, the water in liquid state in the second reservoir is divided into hydrogen gas and oxygen gas by electrolyzing the water in the second reservoir (210) with low potential energy, and hydrogen and oxygen can be easily transferred to the upper part without any extra power source by using their characteristic of being lighter than air chemically.

In addition, the hydrogen from electrolysis in the electrolysis device is transferred through the hydrogen transferring pipe to the first reservoir having high potential energy, is supplied as the fuel of the fuel cell equipped in one end of the first reservoir, and is transformed into water in liquid state by the reaction with oxygen in the air at the fuel cell and stored in the first reservoir. The hydrogen supplied to the fuel cell generates power through electrochemical reaction during the process above, and also produces water in liquid state with heat as by-product.

The small hydro power generation unit transfers some part of power generated by using potential energy of falling water to the grid, and it is desirable to retrieve remaining part of the generated power and supply to the electrolysis device through power conversion.

According to available storage space of the first reservoir or the second reservoir, it is desirable to compose the second control valve allowing power generation by using the maximum potential energy by pouring water stored in the first reservoir to the small hydro power generation unit or to allow power generation of potential energy by supplying directly water from the ground water-collecting source to the small hydro power source unit.

The oxygen produced by electrolysis in the electrolysis device can be utilized after storing in the oxygen storage tank by using the oxygen transferring pipe.

Advantageous Effects

According to the present invention, the present invention relates to allowing stable hydrogen production and fuel supply to a fuel cell for a constant period of time and improving highly availability of new renewable energy power generation source utilization for fuel cell (hydrogen) supply.

In addition to purpose of supplying and producing hydrogen for a fuel cell power generation, the present invention has the effect of improving efficiency in overall system energy consumption and economic feasibility thereby by providing a multiple power generation function allowing additional power generation by using potential energy.

Specifically, hydrogen is lighter than air under atmospheric condition, and can be transferred to a random potential energy level by non-power. Thus, potential energy can be procured with highly decreased consumption power by applying to a small hydro power generation system in which potential energy is proportional to height compared to a means for procuring potential energy by using a conventional pump.

Accordingly, the present invention has the effect to innovatively improve economic feasibility of the overall system by increasing the amount of power generation by a small hydro power generation.

BEST MODE

Hereinafter, a detailed description will be given of the present invention in conjunction with the below drawings.

Figure 1:
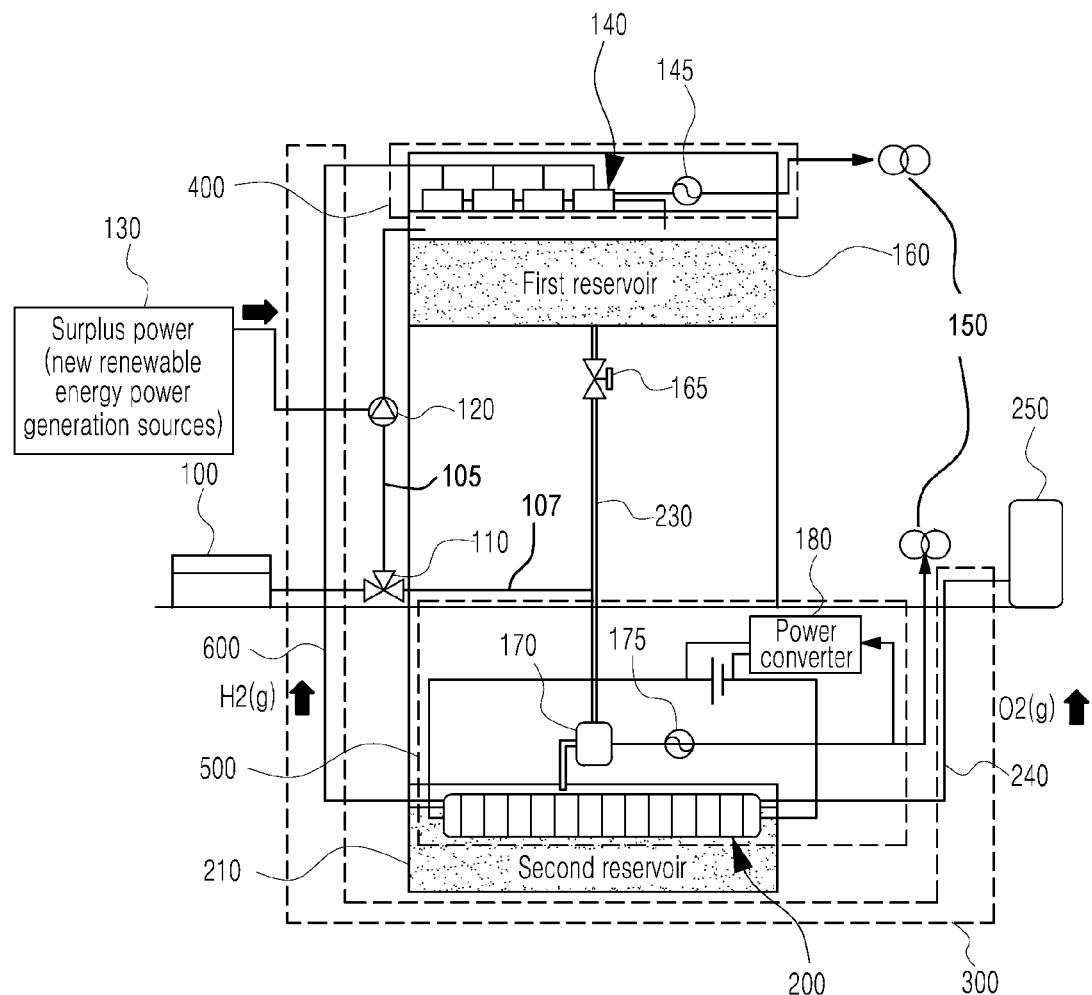
FIG. 1 is a drawing illustrating a potential energy-based power generation system according to the present invention.
Figure 2:
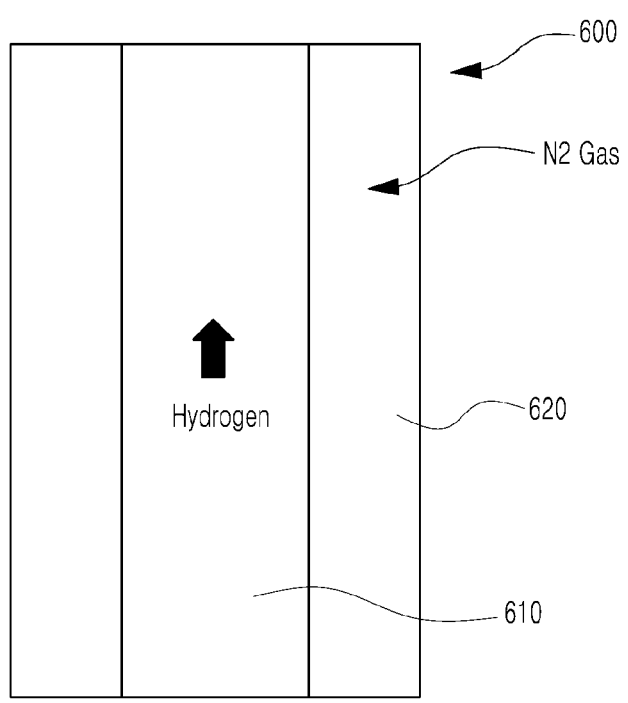
FIG. 2 is a drawing illustrating a configuration of a hydrogen transferring pipe according to the present invention.

FIG. 1 is a drawing illustrating the configuration of a potential energy-based power generation system, and FIG. 2 is a drawing illustrating the configuration of a hydrogen transferring pipe according to the present invention.

As illustrated in FIG. 1, the potential energy-based power generation system according to the present invention comprises a pump (120) and a first reservoir (160) for procuring constant potential energy by receiving power from new renewable energy power generation sources or a surplus power source and transferring water on the ground surface to an upper part of a building; a small hydro power generation unit (500) comprising a small hydro power generation turbine (170) and a second power generator (175) and converting the potential energy into power by pouring the water in the first reservoir (160); a second reservoir (210) located underground of the building to procure additional potential energy, and storing the water which has passed through the small hydro power generation turbine (170); an electrolysis device (200) performing electrolysis by using the power generated by the small hydro power generation unit (500) and the power supplied from the new renewable energy power generation sources or the surplus power source to procure a storage space of the second reservoir (210) for the small hydro power generation, and producing and separating each of hydrogen and oxygen gases; and a fuel cell power generation unit (400) comprising a fuel cell (140) provided at one side of the first reservoir (160) and a first power generator (145), and located at the upper part of the building to generate power by receiving the produced hydrogen gas, and storing water, by-product, generated as a by-product in the first reservoir (160).

In addition, the present invention further comprises a power converter (180) for converting external power (grid power) or power generated by the small hydro power generation turbine (170) into direct current; and a transfer unit (300) including a hydrogen transferring pipe (600) and an oxygen transferring pipe (240) for transferring the produced hydrogen and oxygen gas to a fuel cell (140) and an oxygen storage tank (250) respectively.

The present invention comprises a supply pipe (230) for supplying the water from the first reservoir (160) to the small hydro power generation unit (500), and the supply pipe (230) preferably includes a second control valve (165) for controlling the amount of falling water.

In addition, a pump (120) is installed on a supply pipe (105) for supplying water from the ground water-collecting source (100) to the first reservoir (160). It is desirable to install a first control valve (110) to control the amount of water supply.

Some amount of power from the small hydro power generation unit (500) is sold in connection with the grid (150).

The detailed explanation can be given as follows.

The hydrogen transferring pipe (600) is installed between the electrolysis device (200) and the fuel cell power generation unit (400) in order to transfer hydrogen supplied by the electrolysis device (200) to the fuel cell power generation unit (400), and the oxygen transferring pipe (240) is installed between the electrolysis device (200) and the oxygen storage tank (250) in order to transfer oxygen produced by the electrolysis device (200) to the oxygen storage tank (250).

In addition, it is desirable to apply surplus power of cogeneration or power generated by new renewable power generations to power driving a pump (120) for transferring the water to the first reservoir (160) and storing the water. It is desirable that the power generated by the fuel cell (140) is transferred to the grid (150) in connection, and the water, by-product, is stored as potential energy in the first reservoir (160).

In addition, in case power generation from the surplus power or new renewable energy power generation sources is not allowed and the storage space of the second reservoir (210) is available, the potential energy-based power generation system operates the fuel cell (140) equipped in the first reservoir (160) to generate power by releasing the water through a supply pipe (107) from a ground water-collecting source to the small hydro power generation unit (500), and electrolyzing the water in the second reservoir (210) through the electrolysis device (200) by the generated power, and simultaneously operation for procuring potential energy in the first reservoir (160) can be possible.

As illustrated in FIG. 2, the hydrogen transferring pipe (600) is composed of a double pipe, hydrogen is filled in the inner pipe (610), and an inert gas (such as nitrogen, etc.) is filled in the outer pipe (620) in order to provide safety for transfer of very explosive hydrogen.

The oxygen produced through electrolysis in the electrolysis device (200) is not abandoned, and stored in a separate oxygen storage tank (250) installed on the ground to be utilized usefully.

According to the present invention, the new renewable energy power generation sources are used as power operating a pump which transfers a ground water-collecting source (100) to the first reservoir (160). When the amount stored in the first reservoir (160) reaches above a certain amount, predictable power for a constant period of time is generated by releasing the stored water to the small hydro power generation unit (500) equipped on the ground (or underground).

At this time, a certain part of the generated power is connected with the grid (150) to be sold according to capacity of each reservoir and operating conditions. As the produced hydrogen (fuel) is supplied to the fuel cell (140) by electrolyzing the water of the second reservoir (210) with the other certain part of power, simultaneously the second reservoir (210) should retain the storage capacity which is essential for water falling from the first reservoir (160) to generate power.

In addition, the water in liquid state is divided into hydrogen gas and oxygen gas by electrolyzing the water in the second reservoir (210) with low potential energy, and hydrogen and oxygen can be easily transferred to the upper part without any extra power source by using their characteristic of being lighter than air, chemically.

In addition, the hydrogen from electrolysis in the electrolysis device (200) is transferred through the hydrogen transferring pipe (600) to the first reservoir (160) having high potential energy, is supplied as the fuel of the fuel cell (140) equipped in one end of the first reservoir, and is transformed into water in liquid state by the reaction with oxygen in the air at the fuel cell (140) and stored in the first reservoir (160), and during the process the hydrogen supplied to the fuel cell (140) generates power through electrochemical reaction during the process above, and also produces water in liquid state with heat as by-product.

The small hydro power generation unit (500) transfers some part of power generated by using potential energy of falling water to the grid (150), and it is desirable to retrieve remaining part of the generated power and supply to the electrolysis device (200) through power conversion.

According to available storage space of the first reservoir (160) or the second reservoir (210), it is desirable to compose the second control valve (165) allowing power generation by using the maximum potential energy by pouring water stored in the first reservoir (160) to the small hydro power generation unit (500) or to allow power generation of potential energy by supplying directly water from the ground water-collecting source (100) to the small hydro power generation unit (500).

The oxygen produced by electrolysis in the electrolysis device (200) can be utilized after storing in the oxygen storage tank (250) by using the oxygen transferring pipe (240).

DESCRIPTION OF THE REFERENCE NUMERALS IN THE DRAWINGS

100 Ground water-collecting source
110 First control valve
130 Surplus power (new renewable energy power generation sources)
140 Fuel cell
145 First power generator
150 Grid
160 First reservoir
165 Second control valve
170 Small hydro power generation turbine
175 Second power generator
200 Electrolysis device
210 Second reservoir
250 Oxygen storage tank
300 Transfer unit
400 Fuel cell power generation unit
500 Small hydro power generation unit

What is claimed is:
1. A potential energy-based power generation system comprising:
 a first reservoir disposed on an upper part of a building and configured to reserve water;

a second reservoir located underground of the building and configured to reserve the water;

a first supply pipe connecting the first reservoir and the second reservoir for supplying the water from the first reservoir to the second reservoir;

a small hydro power generation unit configured to convert the potential energy of the water from the first reservoir into first power and comprising:
- a small hydro power generation turbine disposed on the first supply pipe, and
- a first power generator coupled to the small hydro power generation turbine;

a fuel cell power generation unit configured to generate second power by obtaining hydrogen gas and to store the water produced as a by-product in the first reservoir, the fuel cell power generation unit comprising
- a fuel cell provided at one side of the first reservoir, and
- a second power generator coupled to the fuel cell;

an electrolysis device disposed in the second reservoir and configured to perform electrolysis for decomposition of the water in the second reservoir into the hydrogen gas and oxygen gas;

a hydrogen transferring pipe connecting the electrolysis device and the fuel cell power generation unit for transferring the hydrogen gas produced from the electrolysis device to the fuel cell power generation unit;

a ground water-collecting source disposed separately from the first and second reservoirs;

a second supply pipe separate from the first supply pipe and connecting the ground water-collecting source with the first supply pipe to supply ground water by the potential energy of the ground water from the ground water-collecting source to the small hydro power generation turbine;

a third supply pipe configured to supply the ground water from the ground water-collecting source to the first reservoir; and a first control valve being a three-way valve having three ports and disposed on the second supply pipe, wherein first and second ports of the first control valve are coupled to the second supply pipe for controlling an amount of the ground water from the ground water-collecting source to the small hydro power generation turbine, and a third port is coupled to the third supply pipe for controlling an amount of the ground water from the ground water-collecting source to the first reservoir.

2. The potential energy-based power generation system according to claim 1 further comprising:

a power converter for converting an external power or the first power generated by the small hydro power generation turbine into direct current to be supplied to the electrolysis device; and an oxygen transferring pipe for transferring the oxygen gas produced from the electrolysis to an oxygen storage tank.

3. The potential energy-based power generation system according to claim 2, wherein the hydrogen gas is supplied to the fuel cell thereby generating the second power through electrochemical reaction.

4. The potential energy-based power generation system according to claim 1, further comprising
a first pump installed on the third supply pipe for transferring the ground water from the ground water-collecting source to the first reservoir, wherein the first pump is driven by an external power.

5. The potential energy-based power generation system according to claim 1, wherein the second power generated by the fuel cell power generation unit is transferred to a grid.

6. The potential energy-based power generation system according to claim 5, wherein the first power generated by the small hydro power generation unit is transferred to the grid.

7. The potential energy-based power generation system according to claim 1, wherein the hydrogen transferring pipe includes an inner pipe through which the hydrogen gas passes, and an outer pipe in which an inert gas is filled.

8. The potential energy-based power generation system according to claim 1, wherein the small hydro power generation unit generates the first power by the potential energy of the ground water from the ground water-collecting source in a case such that no water is supplied to the small hydro power generation unit from the first reservoir.

9. The potential energy-based power generation system of claim 1, wherein the first power generated by the small hydro power generation unit is transferred to a grid.

10. The potential energy-based power generation system according to claim 1, wherein the hydrogen and oxygen gas are transferred to the first reservoir and oxygen storage tank, respectively, without any extra power source.

11. The potential energy-based power generation system according to claim 1, wherein the hydrogen gas is supplied to the fuel cell thereby generating the second power through electrochemical reaction.

12. The potential energy-based power generation system according to claim 1, wherein the first supply pipe is provided with a first second control valve for controlling an amount of the water supplied from the first reservoir.

\* \* \* \* \*